US008312061B2

(12) United States Patent
Millington et al.

(10) Patent No.: US 8,312,061 B2
(45) Date of Patent: Nov. 13, 2012

(54) SYSTEM FOR BROADCAST INFORMATION DATABASE

(75) Inventors: Jeffrey A. Millington, Rochester Hills, MI (US); David Gersabeck, Commerce Township, MI (US); Jeffrey Janus, Waterford, MI (US)

(73) Assignee: Harman International Industries, Incorporated, Northridge, CA (US)

( * ) Notice: Subject to any disclaimer, the term of this patent is extended or adjusted under 35 U.S.C. 154(b) by 352 days.

(21) Appl. No.: 12/368,802

(22) Filed: Feb. 10, 2009

(65) Prior Publication Data

US 2010/0205223 A1 Aug. 12, 2010

(51) Int. Cl.
*G06F 7/00* (2006.01)
*G06F 17/30* (2006.01)

(52) U.S. Cl. .......................................... 707/812; 707/913

(58) Field of Classification Search .................. 707/803, 707/812, 913–916

See application file for complete search history.

(56) References Cited

U.S. PATENT DOCUMENTS

| | | | | |
|---|---|---|---|---|
| 6,594,825 | B1 * | 7/2003 | Goldschmidt Iki et al. | 725/53 |
| 6,748,237 | B1 * | 6/2004 | Bates et al. | 455/553.1 |
| 6,810,526 | B1 * | 10/2004 | Menard et al. | 725/46 |
| 6,952,576 | B2 * | 10/2005 | Fish et al. | 455/414.1 |
| 6,990,453 | B2 * | 1/2006 | Wang et al. | 704/270 |
| 7,065,333 | B2 * | 6/2006 | Engstrom | 455/184.1 |
| 7,171,677 | B1 * | 1/2007 | Ochiai | 725/80 |
| 7,260,312 | B2 * | 8/2007 | Srinivasan et al. | 386/248 |
| 7,343,141 | B2 * | 3/2008 | Ellis et al. | 455/132 |
| 7,353,000 | B2 * | 4/2008 | Morgan | 455/45 |
| 7,580,325 | B2 * | 8/2009 | Welk et al. | 369/30.06 |
| 7,643,807 | B2 * | 1/2010 | Gupta et al. | 455/179.1 |
| 7,711,838 | B1 * | 5/2010 | Boulter et al. | 709/231 |
| 7,739,152 | B2 * | 6/2010 | Waites | 705/26.43 |
| 7,987,280 | B1 * | 7/2011 | Putnam et al. | 709/231 |
| 7,995,673 | B2 * | 8/2011 | Mitzel et al. | 375/295 |
| 2002/0016960 | A1 * | 2/2002 | Yamato et al. | 725/1 |
| 2002/0122656 | A1 * | 9/2002 | Gates et al. | 386/46 |
| 2002/0162101 | A1 * | 10/2002 | Gutta et al. | 725/9 |
| 2003/0013425 | A1 * | 1/2003 | Nee | 455/186.1 |
| 2004/0116088 | A1 * | 6/2004 | Ellis et al. | 455/132 |
| 2004/0131255 | A1 * | 7/2004 | Ben-Yaacov et al. | 382/190 |
| 2004/0267805 | A1 * | 12/2004 | Sezan et al. | 707/102 |
| 2006/0123053 | A1 * | 6/2006 | Scannell, Jr. | 707/104.1 |

(Continued)

OTHER PUBLICATIONS

ST2 Starmate Replay SIRIUS Satellite Radio Plug and Play User and Installation Guide, 2005, SIRIUS Satellite Radio, Inc., pp. 23-31 (60 pgs.).

*Primary Examiner* — Jeffrey A Burke
(74) *Attorney, Agent, or Firm* — Brinks Hofer Gilson & Lione

(57) ABSTRACT

A database system includes a processor configured to receive broadcasts according to a plurality of broadcast formats. The processor determines broadcast information associated with each received broadcast. The processor stores a database entry for each received broadcast within a database stored in the memory. Each database entry is indicative of the broadcast information associated the received broadcast. The processor continuously populates the database with broadcast information associated with received broadcasts. The database is user-accessible, allowing database entries to be viewed and altered. Ratings for various broadcast information are user-provided allowing preferred broadcast content to be user-designated based on the broadcast information. The ratings are used to notify a user of preferred broadcast content being broadcast according to at least one of the broadcast formats allowing the user to select receipt of the preferred broadcast content while available.

28 Claims, 7 Drawing Sheets

U.S. PATENT DOCUMENTS

2006/0174265 A1* 8/2006 Hauser, Jr. .................. 725/34
2007/0008956 A1* 1/2007 Moran et al. .................. 370/352
2007/0143816 A1* 6/2007 Gupta et al. .................. 725/135
2007/0238409 A1* 10/2007 Srail .................. 455/2.01
2007/0288478 A1* 12/2007 DiMaria et al. .................. 707/10
2007/0288966 A1* 12/2007 Javid et al. .................. 725/46
2008/0134264 A1* 6/2008 Narendra et al. .................. 725/110
2008/0188029 A1* 8/2008 Rhodes .................. 438/59
2008/0188209 A1* 8/2008 Dorogusker et al. .................. 455/414.2
2008/0208851 A1* 8/2008 Briggs et al. .................. 707/6
2008/0222690 A1* 9/2008 Kim .................. 725/110
2008/0288460 A1* 11/2008 Poniatowski et al. .................. 707/3
2008/0290970 A1* 11/2008 DeBusk et al. .................. 334/1
2008/0306936 A1* 12/2008 Ho et al. .................. 707/5
2009/0165057 A1* 6/2009 Miller et al. .................. 725/68
2009/0187577 A1* 7/2009 Reznik et al. .................. 707/10
2009/0205000 A1* 8/2009 Christensen et al. .................. 725/61
2009/0300508 A1* 12/2009 Krampf et al. .................. 715/739
2010/0081404 A1* 4/2010 Harrison et al. .................. 455/186.1
2010/0154008 A1* 6/2010 Hicks et al. .................. 725/62
2010/0161562 A1* 6/2010 Karajagi .................. 707/664
2010/0217755 A1* 8/2010 Vignoli .................. 707/706
2010/0267331 A1* 10/2010 Ingrassia et al. .................. 455/3.04

* cited by examiner

FIG. 4

| Database Fields | Type | Description |
|---|---|---|
| Record_ID | Autonumber | Primary Key of the database, used to uniquely identify each record |
| Song_Name | Text | Song Name |
| Artist_Name | Text | Artist Name |
| Album_Name | Text | Album Name |
| Genre | Text | Music Genre |
| Channel_ID | Text | Satellite Radio Channel Number, FM Frequency, HD Freq + Channel, TV Channel |
| Channel_Name | Text | Name of the Channel if available |
| Ad_Category | Text | Category of Advertisement |
| Ad_Title | Text | Title of Advertisement |
| Ad_Sponsor_Name | Text | Advertisement Name or Sponsor |
| Ad_Seller_Name | Text | Advertisement Seller Name |
| Ad_Description | Text | Text Description of Advertisement |
| Ad_Phone | Text | Advertisement Phone number |
| Ad_Website | Text | Advertisement Website |
| Ad_Image | File | Advertisement Image |
| Ad_Logo | File | Seller Logo Image |
| Ad_Price | Number | Price of product / service |
| Ad_Expiration | Date | Date when Price of Product / Service expires |
| Contest_Category | Text | Category of Contest |
| Contest_Name | Text | Contest Name |
| Contest_Phone | Text | Contest Phone number |
| Contest_Website | Text | Contest Website |
| Talk_Category | Text | Category of Talk |
| Talk_Host | Text | Talk Show Host |
| Talk_Name | Text | Talk Show Name |
| Talk_Phone | Text | Talk Phone number |
| Talk_Website | Text | Talk Website |
| Album_Art | File | Album artwork associated with song |
| TV_Channel_Name | Text | Name of the TV Channel |
| TV_Show_Name | Text | Name of the TV Show |
| TV_Show_Parental_Rating | Text | Parental rating associated with the TV show |
| TOD | HH:MM:SS | Time the entry was created / updated |
| DATE | MM/DD/YYYY | Date the entry was created / updated |
| Tuner_Source | Text | FM, HD, Satellite Radio |
| Song_Freq_Count | Number | Running count of Song Name playback from all sources, when equal to 1, considered to be a New Song |
| Artist_Freq_Count | Number | Running count of Artist Name playback from all sources, when equal to 1, considered to be a New Artist |
| Album_Freq_Count | Number | Running count of Album Name playback from all sources, when equal to 1, considered to be a New Album |
| Song_Listen_Freq_Count | Number | Number of times this Song has been listened too. |
| Artist_Listen_Freq_Count | Number | Number of times this Artist has been listened too. |
| Album_Listen_Freq_Count | Number | Number of times this Album has been listened too. |
| Flag_Purchase | Y/N | Flag used to provide user a list of content to purchase |
| Flag_Song_Alert | Y/N | Flag used to provide user HMI feedback when Song is currently playing on any RF source |
| Flag_Artist_Alert | Y/N | Flag used to provide user HMI feedback when Artist is currently playing on any RF source |
| Flag_Album_Alert | Y/N | Flag used to provide user HMI feedback when Album is currently playing on any RF source |
| Song_Rating | Number | User set rating for Song |
| Artist_Rating | Number | User set rating for Artist |
| Album_Rating | Number | User set rating for Album |
| TV_Show_Rating | Number | User set rating for the TV show |

SYSTEM FOR BROADCAST INFORMATION DATABASE

BACKGROUND OF THE INVENTION

1. Technical Field

This invention relates to broadcast information databases, and more specifically to broadcast information databases for various broadcast formats.

2. Related Art

Audio/video systems currently have a number of broadcast formats in which to receive audio and video material, such as music, television programming, talk-radio programming and the like. Broadcast formats have continued to increase in numbers. As the broadcast formats have increased, so has the amount of data associated with broadcast transmission. For example, radio-based broadcasts may be transmitted according to formats such as FM radio data system (FM-RDS), satellite radio, or high-definition radio. Each of these formats may transmit data identifying a particular broadcast, such as identifying subject content of the particular broadcast.

Available data associated with a broadcast may be used to cross-reference broadcasts transmitted via other broadcast formats. Thus, data associated with a broadcast may be used to identify subsequent broadcasts according to various broadcast formats. Therefore, a need exists to provide a database system to store data associated with broadcasts transmitted via various broadcast formats.

SUMMARY

A database system may be configured to include a processor and a memory. The processor may be configured to receive a plurality of broadcasts. Each broadcast may be transmitted according to one of a plurality of broadcasts formats. The processor may determine broadcast information associated with each one of the plurality of broadcasts. The processor may enter a database entry in a database stored in the memory. Each database entry may be indicative of the broadcast information associated with each of the broadcasts received by the processor. The processor may be configured to continuously populate the database with database entries as each broadcast is received by the processor. The processor may also continuously populate the database while audio/video media is being provided to a user. The processor may also be configured to purge the database of particular database entries either automatically or based on user control.

A user may access the database allowing the database entries to be sorted and manipulated by a user. The user may add data to each database entry, such as ratings associated with the broadcast content of each database entries. The ratings may be related to the broadcast information for each database entry. The ratings may be used to notify users of preferred broadcast content available to be received according to at least one of the broadcast formats. The database entries may include various fields allowing a user to search the various fields using keywords or other search criteria.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is a table of example fields that may be used to categorize broadcast information according to a plurality of broadcast formats in a broadcast information database.

DETAILED DESCRIPTION OF THE PREFERRED EMBODIMENTS

A broadcast information database system is configured to store broadcast information. This is accomplished generally by configuring a processor to receive broadcasts transmitted via a plurality of broadcast formats. The processor may monitor each broadcast format and determine broadcast information transmitted with an associated broadcast. The processor may store broadcast information in a database allowing each broadcast to have associated information entered as a database entry.

Figure 1:
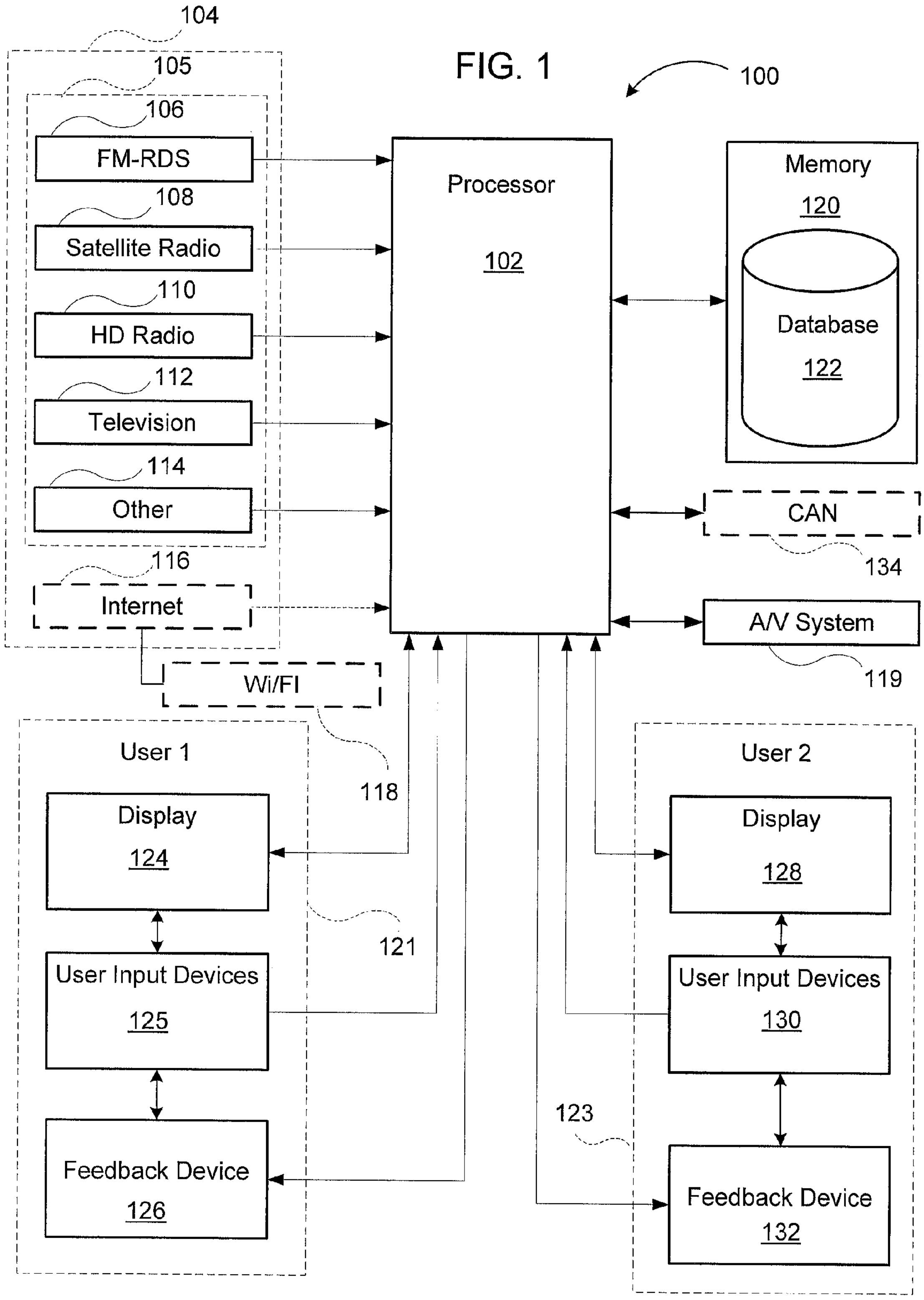
FIG. 1 is a block diagram of an example of a broadcast information database system.

In FIG. 1, a block diagram of a broadcast database system 100 is shown. The system 100 may include a processor 102 configured to receive broadcasts transmitted via a plurality of broadcast formats 104, such as FM radio, satellite radio, high-definition (HD) radio, television, Internet, or other broadcast format. In one example, the system 100 may include a plurality of tuners dedicated to each of the tuner-based broadcast formats 105 for providing broadcasts to the processor 102. In FIG. 1, the system may include a FM-radio data system (RDS) tuner 106, a satellite radio tuner 108, a high-definition (HD) radio tuner 110, a television tuner 112, and a tuner 114 that may be used for other broadcast formats. In one example, the processor 102 may receive Internet broadcasts, such as streaming audio, through an Internet connection 116, when connection is available physically or wirelessly, such as through a Wi-Fi antenna 118. Various processing techniques may be implemented by the processor 102 such as multiprocessing, multitasking, parallel processing and the like, for example. The processor 102 may include additional processors, cards, or other suitable devices or desired performance.

The system 100 may be configured to operate with an audio/video system. In one example, the system 100 may be used to provide audio/video output, such as music or television programming, through an audio/visual system. Thus, the system 100 may be integrated into various audio/video systems such as a vehicle audio/video system, or other suitable audio/video system configured to receive various broadcast formats. In FIG. 1, an audio/video (A/V) system 119 is shown as being in communication with the processor 102. The processor 102 may be integrated into the A/V system 119 in alternative examples. The A/V system 119 provides audio/video output received from the processor 102 according to one of the broadcast formats 104. The system 100 may be configured to be modular, allowing the system 100 to be used with other A/V systems. For example, the system 100 may be portable allowing the system 100 to be used in compatible home environments and vehicle environments, for example.

Each of the broadcast formats 104 may provide broadcasts having varying content such as music, radio programs, commercials, and television programming. The broadcasts may be transmitted from various broadcast sources. For example, satellite radio may include a plurality of channels with each channel being a particular broadcast source. Radio stations may be considered broadcasts sources of FM-RDS format and HD-radio, with each station transmitting broadcasts at an operating frequency within the spectrum associated with FM radio. Each of the broadcast formats 104 in FIG. 1 may provide broadcast information along with an associated broadcast to the processor 102 allowing the processor 102 to determine subject content and other information associated with each received broadcast. For example, a particular frequency, or channel, of the satellite radio broadcast format may be associated with a radio station transmitting a particular song. The satellite radio format allows associated broadcast information to be transmitted as well, such as the channel name, song title, artist, album, genre, etc. This broadcast information may be received and determined by the processor 102.

The processor 102 may include, or be connected to, a memory 120. The memory 120 may include a database 122 configured to store the information received by the processor 102 regarding broadcast information of each particular broadcast. The memory 120 may be computer-readable storage media or memories, such as a cache, buffer, RAM, removable media, hard drive or other computer readable storage media. Computer readable storage media may include various types of volatile and nonvolatile storage media.

In one example, the broadcast database 122 may store a database entry for each unique broadcast received by the processor 102. The processor 102 may continuously monitor broadcasts transmitted via each broadcast format 104. The processor 102 may simultaneously receive as many broadcasts for the tuner-based broadcast formats 105 as the number of tuners allow. For example, if a tuner is available in the system 100 for each tuner-based format 105, the processor 102 may simultaneously receive a broadcast from each of the tuner-based broadcast formats 105. Similarly, the processor 102 may simultaneously receive a broadcast from an Internet broadcast format when the Internet connection 116 is available.

In one example, the processor 102 may continuously monitor broadcasts being received through the tuner-based broadcast formats 105. For example, the satellite radio tuner 108 may be used to continuously scan across each channel provided for satellite radio format. Scanning across each channel allows the processor 102 to receive each broadcast being transmitted from each radio station broadcast source. As the tuner 108 scans across each available station, the processor 102 may receive each broadcast being transmitted at the time the associated station is scanned. The processor 102 may determine the broadcast information received with a broadcast and store a database entry in the database 122 indicative of the broadcast information. Similarly, the processor 102 may scan across each operating domain of a particular tuner-based broadcast format 105, such as the operating frequency domain of the FM-RDS broadcast format.

The system 100 may operate such that a user may listen and/or view content according to a particular broadcast format as the processor 102 continuously monitors each of the broadcast formats 104 to determine broadcast information. Thus, the processor 102 may continuously operate in the background allowing broadcast information to be continuously added to the database 122 during operation of the A/V system 119.

Each tuner-based broadcast format 105 may transmit broadcasts received and monitored by the processor 102. As each tuner scans across a respective operating domain, the processor 102 may continuously receive broadcast information for each broadcast. As the processor 102 determines the particular broadcast information, the processor 102 may populate the database 122 with database entries indicative of the broadcast information associated with a particular broadcast. For example, the processor 102 may be configured to monitor each broadcast format 104 sequentially in groups or in parallel. The processor 102 may first monitor the FM-RDS broadcast format as the tuner 104 scans across the entire operating domain. The processor 102 may receive the broadcast information of each broadcast received across the operating domain and populate the database 122 with an appropriate database entry. After the entire FM-RDS operating domain is scanned, the processor 102 may then receive broadcasts from the satellite radio format through the tuner 108, or may do so in parallel. The tuner 108 may scan across the entire operating domain of the satellite radio format, such as each satellite radio channel. The processor 102 may populate the database 122 with database entries indicative of the broadcast information associated with each satellite radio broadcast received by the processor 102.

An HD radio format tuner 110 may be similarly monitored by the processor 102 in order to populate the database 122, as may the other broadcast formats, including the Internet broadcast format. In one example, the processor 102 may recognize if a particular broadcast has been previously added as a database entry based on the associated broadcast information. In this event, the processor 102 may indicate in the database 122 that a broadcast previously entered as a database entry is being transmitted again according to the same broadcast format or another broadcast format.

The processor 102 may also be in communication with various user components. In one example, the system 100 includes user interfaces 121, 123 that each include interactive components for two users, user 1 and user 2, respectively. In alternative examples, the system 100 may be configured to interact with a single user or more than two users. In one example, the user interface 121 may include a display 124, one or more input devices 125, and a feedback device 126. The user interface 123 similarly includes a display 128, user input device(s) 130, and a feedback device 132. The user interfaces 121, 123 may operate in substantially the same manner. Thus, description of the user interface 121 and associated components may be applied to the user interface 123.

The display 124 and user input device 125 of the user interface 121 may be configured to allow a user to interact with the database 122. The display 124 may allow a user to view the contents of the database 122. The user interface 121 may also include the user feedback device 126, which may interact with the display 124 and the user input device 125. The user may select various database entries or particular broadcasts to be preferred such as those having a particular broadcast content. Broadcast content may relate to the actual program being transmitted. In one example, a broadcast may be particular song. The broadcast content may relate to the song title, musical artist, genre, or associated album. The processor 102 may recognize a database entry in the database 122 as including broadcast information associated with a preferred broadcast, which allows the processor 102 to notify a user if a preferred broadcast being transmitted over one of the broadcast formats 104 based on the associated broadcast formats. Thus, the user may be receiving a current broadcast via one of the plurality of broadcast formats 104. If the processor 102 recognizes a preferred broadcast via another or currently-provided broadcast format based on the associated broadcast information, the processor 102 may provide notification that the preferred broadcast is currently available. The user may switch from the current broadcast to the preferred broadcast, if desired, using an interface such as the input device 125 of the user interface 121.

In one example, the system 100 may be configured to operate with or as part of a vehicle audio system. The processor 102 may be connected to a controller area network (CAN) 134. The CAN 134 may be implemented to recognize a particular user that is operating the vehicle. In one example, the CAN 134 may recognize through a key fob that a particular user is operating the car. The user recognition may be communicated to the processor 102 allowing the processor 102 to configure and to provide access the database 122 according to the preferences of the particular user.

Figure 2:
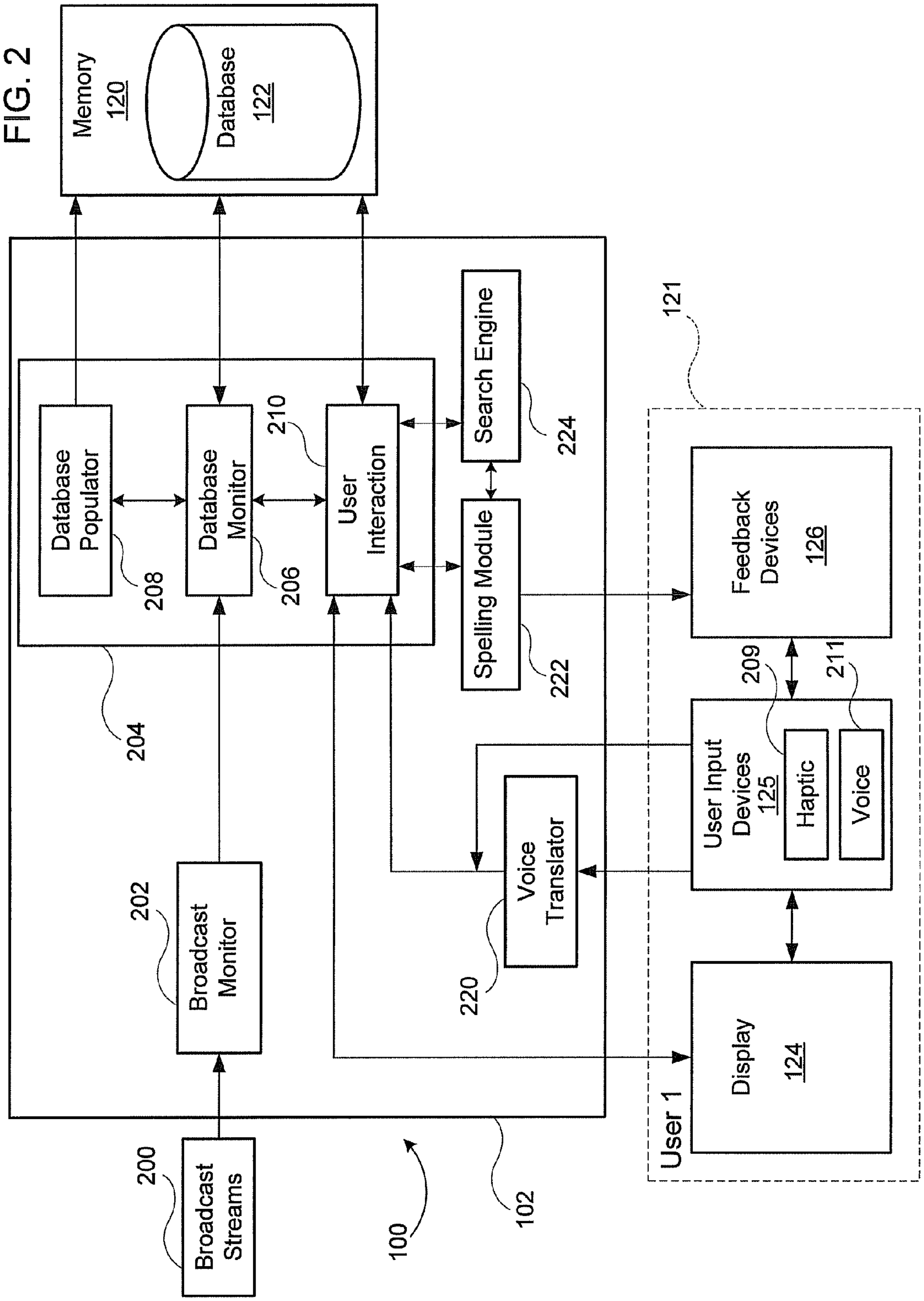
FIG. 2 is another block diagram of an example of a broadcast information database system.

In FIG. 2, a block diagram is shown of the processor 102 configured to execute various modules. As discussed with regard to FIG. 1, the processor 102 may receive broadcasts transmitted according to various broadcast formats. In the example of FIG. 2, the broadcast formats are designated as broadcast streams 200 and may represent the various broadcasts transmitted according to the broadcast formats 104 discussed with regard to FIG. 1.

A broadcast monitor module 202 may be executable by the processor 102, which allows the processor 102 to receive and monitor the particular content of each broadcast format. The broadcast monitor module 202 may be configured to monitor any number of broadcast streams 200 in parallel, in groups, sequentially, or in a predetermined or random order. The broadcast monitor module 202 may receive broadcast information and transmit the broadcast information to a database management module 204. The database management module 204 is configured to interact with the database 122. The database management module 204 may include a database monitor module 206. The database monitor module 206 may be configured to receive the broadcast information from the broadcast monitor module 202. The database monitor module 206 may compare the broadcast information received to database entry information stored in the database 122. The database monitor module 206 may determine if the broadcast information received has already been entered into the database 122. If the broadcast information associated with the broadcast has not been added to the database 122, the database management module 204 may implement a database populator module 208 that may receive the broadcast information from the database monitor module 206 and interact with the database 122 to create a database entry indicative of the broadcast content based on the broadcast information.

When a database entry for a broadcast previously exists but is being transmitted again, the database monitor module 206 may determine that the broadcast has been previously added as a database entry, but may adjust a field in the database entry indicative of the frequency with which a particular broadcast has been received via any of the broadcast formats. The entry may serve as a counter allowing the frequency (i.e., number of times) with which a broadcast is transmitted to be logged.

The database management module 204 may include a user interaction module 210. The user interaction module 210 may be configured to receive user input and to provide feedback to a user. In FIG. 2, the user interaction module 210 is shown as being in communication with the user interface 121. The user interaction module 210 may receive user input from the user input device 125. The user input device 125 may include a haptic input device 209, such as a keypad or touch screen interface, as well as, a voice-activated input device 211. In one example, the haptic input device 209 may be integrated into the display 124, such as a touch screen interface. The processor 102 may include a voice translator module 220 allowing voice input to be converted to data suitable for the user interaction module 210. In one example, the voice translator module 220 may be integrated into the user interaction module 210.

A user may access the database 122 through the user input device 125. The user interaction module 210 may receive user input data and provide access to the database 122. In one example, a user may desire to determine if any database entries for a particular musical artist are stored in the database. The user input devices 125 may allow the user to provide search terms used to seek out the particular artist. In one example, the processor 102 may implement a spelling module 222 and a search engine module 224. The spelling module 222 may be used to alter characters available to a user. As a user inputs characters to determine if particular broadcast information is stored in the database 122, the user interaction module 210 may locate database entries having the currently-input characters. Thus, if a user enters a string of characters, the search engine 224 may return available entries from the database 122 having the particular string of characters. The spelling module 222 may determine that certain characters can be eliminated as choices available to as user based on the string of characters entered by a user because the entries in the database 122 containing the currently-input string of characters have less than all possible characters available for input. The feedback device 126 may be implemented to alter the characters available to a user at the user input devices 125.

In alternative examples, the processor 102 may be further configured to purge the database 122 of particular database entries. In one example, the processor 102 may be configured to purge database entries that have not been received via broadcast information for a predetermined amount of time. Thus, if a particular song is stored in the database 122 and has not been received by the processor 102 according to any of the broadcast formats 104, the processor 102 may remove the database entry for the song from the database 122. The processor 102 may be configured to purge the database 122 of database entries individually, or may be configured to perform routine database purges of the database 122 periodically over predetermined time intervals. In other examples, a user may access the database 122 to purge the database 122 of selected database entries.

Figure 3:
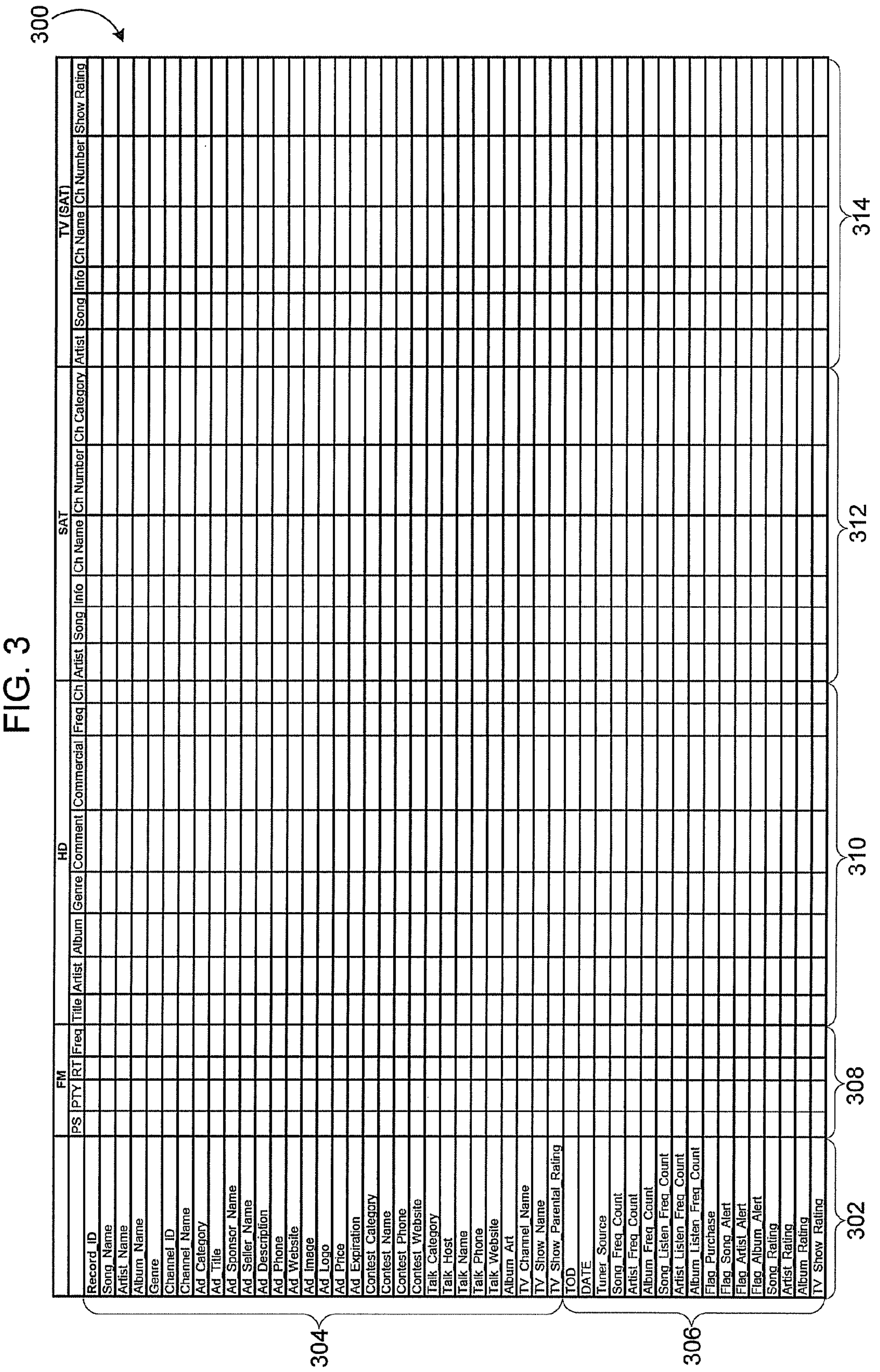
FIG. 3 is a table of example broadcast information that may be included in a broadcast information database.

FIG. 3 is an example of a table 300 indicating various fields that may be used to categorize broadcast information stored in the database 122. Column 302 of the table 300 includes descriptor fields that may be associated with a broadcast having broadcast information stored as a database entry. FIG. 4 provides example general descriptions and formats for each of the fields in column 302. The "Record_ID" field may be a unique identifier that may be used to identify each database entry. The unique identifier may be reused if a database entry initially having the Record_ID is deleted. The other fields in the column 302 may be directed towards the type and content of a broadcast. For example, the fields may be used to describe musical content, radio talk show content, television programming, as well as radio or television commercials and contests.

In one example, the rows in group 304 may represent fields that may be populated based on received broadcast information. The rows in group 306 may represent fields that may be generated by the system 100, such as the time a broadcast was entered ("TOD") in the database 122. The fields of group 306 may also represent user-based preferences, such as user-entered ratings, frequency counts, and alerts set by a user. For example, a user may select an alert for specific a song indicating that the user desires to be notified when the song is being transmitted over any of the broadcast formats 104. The field "Flag_Song_Alert" may be set for a particular song when the song information is entered into the database 122. Each time that the particular song is broadcast, based on the flag being set, the system 100 may alert a user that the broadcast is currently available for listening according to one of the broadcast formats. The user may select to change from a current broadcast being provided as audio/video output to the broadcast source transmitting the song, which may be on a different format. A user may also be alerted even if no broadcast is currently being provided, such as when an associated audio/video system is powered off. Similarly, the "Flag_Album_Alert" and "Flag_Artist_Alert" may be set to notify a user when a broadcast features a track from a particular album or a particular artist, respectively. The "Alert" fields may be used to designate preferred broadcasts as previously discussed. The "Alert" fields may be expanded to include television content or non-musical radio content, for example.

The table 300 also indicates particular types of broadcast information a particular broadcast format may transmit. For example column group 308 contains information types associated with an FM-RDS broadcast format. Column "PS," or "program service," may be an eight-character static display that represents call letters or a FM station identity name. Column "PTY," or "program type" may indicate a particular genre of a broadcast. Column "RT," or "radio text," may be free-form textual information of 64 characters that can be either static (e.g., station slogans) or in sync with the programming such as the title and artist of a currently-playing song.

Similarly, column group 310 includes broadcast information types that may be included in a HD-radio broadcast, such as title, artist, album, genre, comment, commercial information, and a particular frequency, for example. Column group 312 includes broadcast information types that may be included in a satellite radio format. The information may include artist, song, general information, channel name, channel number, and channel category, such a genre, for example. Column group 314 includes broadcast information types that may be included in satellite television broadcast format. The information may include, artist, song, general information, channel name, channel number, and show rating, for example. The fields of column 302 may be used for other broadcast formats as well, such as Internet broadcasts, for example.

Figure 5:
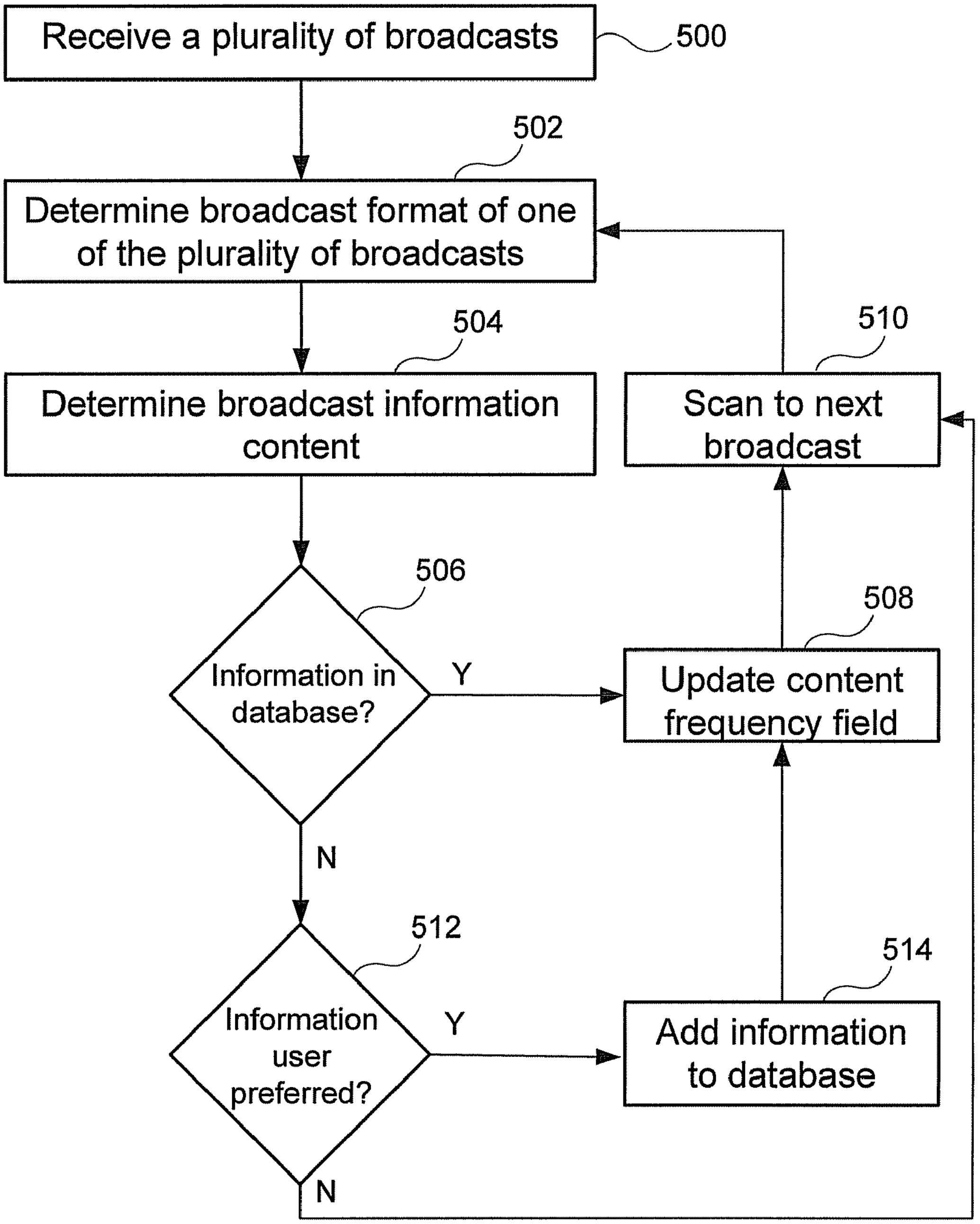
FIG. 5 is a flow diagram of an example operation to populate a broadcast information database.

FIG. 5 shows one example of an operation for entering broadcast information into a database, such as the database 122. The operation may include a step 500 of receiving a plurality of broadcasts. In one example, step 500 may be performed by a processor, such as the processor 102, which is configured to receive a plurality of broadcasts, which may be transmitted via a number of broadcast formats. The operation may also include a step 502 of determining a broadcast format of one of the plurality of broadcasts. In one example, a processor, such as the processor 102, may determine a particular broadcast format of a received broadcast. As previously discussed with regard to FIGS. 1 and 2, the processor 102 may receive a plurality of broadcasts via a number of broadcast formats, such as tuner-based formats or other formats, such as Internet-based. The processor 102 may also be configured to recognize the broadcast format of a received broadcast.

The operation may include a step 504 of determining broadcast information of a broadcast. In one example, the broadcast information may include the type of broadcast, such as a song, commercial, talk-radio program, or television program. The broadcast information may also include further details of a broadcast, such as song title, album, or artist. Column 302 of FIG. 3 indicates various examples of broadcast information that may be obtained from a broadcast. In one example, a processor, such as the processor 102 may determine the broadcast information transmitted along with received broadcasts. In another example, the broadcast information may be commercial content and include an internet address or phone number related to a particular business or service represented through the commercial. A user may be directly connected with the website of the business or service if an internet connection is available or may be directly connected through a cellular telephone using the phone number included in the broadcast information. A relationship may be established between an advertiser and a business or service, such that the business or service may pay for commercials based on the frequency that the business or service is contacted through the website or phone number provided via the broadcast information.

The operation may include a step 506 of determining if the broadcast information associated with the broadcast has been previously added to the database as a database entry. In one example, a processor may interact with a memory storing a database configured to store broadcast information, such as that described in FIGS. 1 and 2. As described in FIGS. 1 and 2, the processor 102 may interact with the database 122 to determine if broadcast information associated with a broadcast has been previously entered into database. In one example, the broadcast information for a broadcast may be recognized as being previously entered by the processor 102, even if a current broadcast being considered is being transmitted via a broadcast format different than that of the current broadcast.

If the broadcast information has been previously added, a step 508 may be performed, which updates any frequency fields related to the broadcast. For example, column 302 of table 300 includes artist, album, and song frequency fields. In one example, if the broadcast is a song that has previously been entered into the database, the frequency fields for artist, title, and album may be updated to reflect the song has been transmitted again. The frequency fields may allow a user to determine how often a particular broadcast content appears. For example, a user may generate a list of the top 40 songs played over a preselected time frame. The list may provide the 40 most played songs over the preselected time frames based on the frequency fields.

Upon updating any associated frequency fields for the database entry, a step 510 may be performed allowing a next broadcast to be analyzed in a similar manner. In one example, each broadcast being transmitted via a particular broadcast format may be scanned prior to another broadcast format being monitored and analyzed. In alternative examples, broadcasts may be monitored in any particular order regardless of format.

If the broadcast information has not previously been entered into the database, a step 512 may be performed of determining if a broadcast is preferred by a user. In one example, a user may select particular information associated with a broadcast as being preferred, such as a particular musical artist. Broadcast information associated with the preferred broadcast may be stored in a database. If the broadcast is not preferred, step 510 may be performed. If the broadcast information is preferred, a step 514 may be performed, which adds broadcast information to the database. In alternative examples, the operation of FIG. 5 may be performed without consideration of preferred user selections at step 512.

Figure 6:
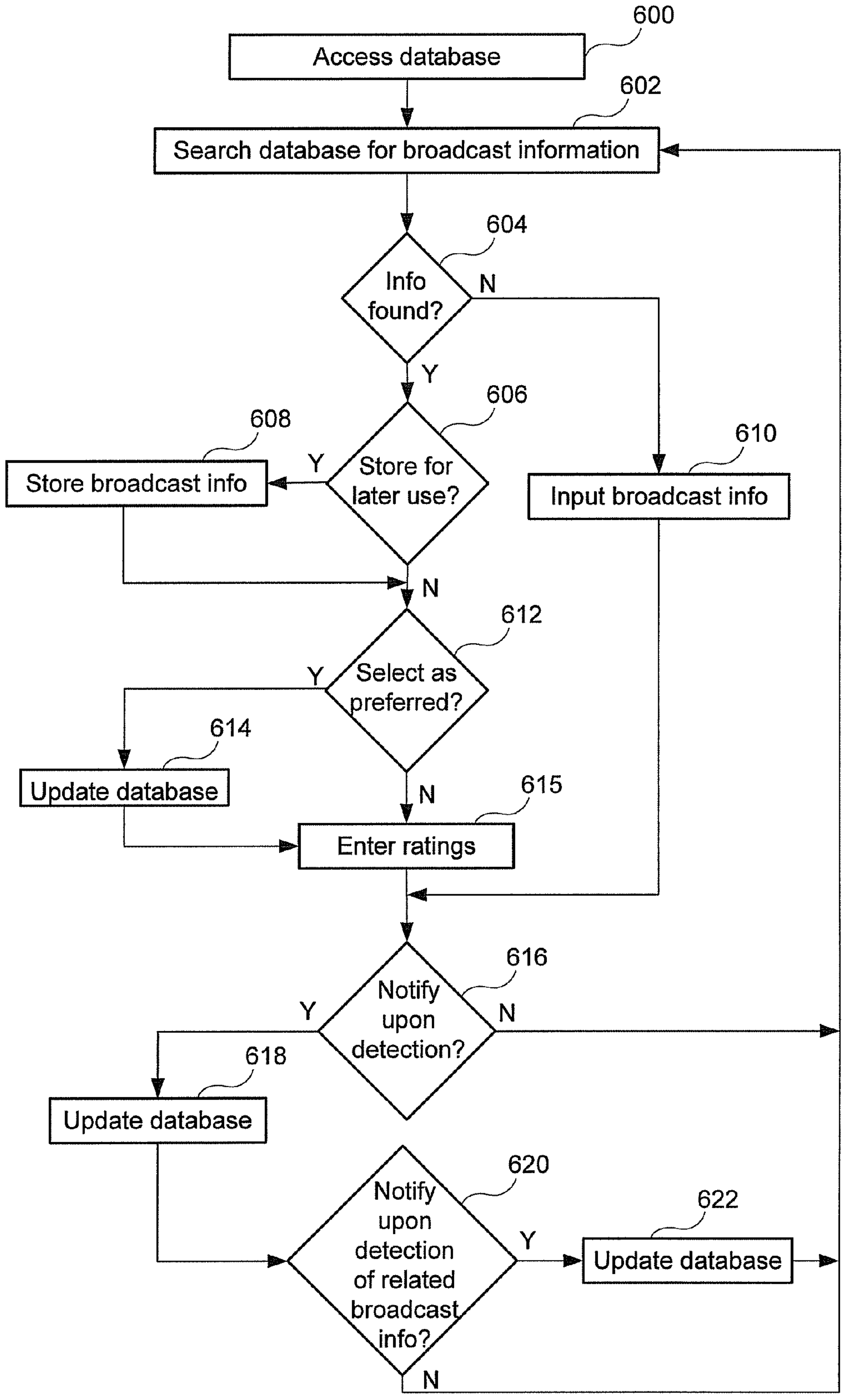
FIG. 6 is a flow diagram of an example operation to access a broadcast information database.

FIG. 6 is a flow diagram of an example operation to access a broadcast information database. In one example, the operation of FIG. 6 may be performed by a user through a user interface such as the user interface 121 of FIGS. 1 and 2. The operation may include a step 600 of accessing a database, such as the database 122 of FIGS. 1 and 2. The operation may include a step 602 of searching the database. In one example, a search engine, such as the search engine 224 may receive input to search a broadcast information database for particular broadcast information. In one example, a user may be limited to selections based on the contents of the database. A spelling module, such as the spelling module 222 may be used to provide a user with input options based on the contents of the database, which may prohibit the user from entering search parameters that would not result in finding matching database entries.

If the broadcast information is located in the database at a step 604, a user may determine if the broadcast information is to be stored for later use at a step 606. In one example, a user may desire to tag a particular database entry for later use, such as to purchase via download. If a user desires the broadcast information to be stored for later use, a step 608 may be performed. Performance of step 608 stores the broadcast information in memory, such as the memory 120 in FIG. 1. Step 608 may also include transmission of the stored broadcast information, such as through an available internet connection, for example. A user may subsequently retrieve the information for later use, such as when an internet connection is available. In another example, a user may transmit the stored broadcast information to a computer or cellular telephone for later use, such as for purchasing the associated broadcast content via download.

If the broadcast information sought is not included in the database, a user may enter broadcast information to be included in the database entry when associated broadcasts are recognized at step 610. In one example, a user may desire broadcasts of a particular talk-radio program to be designated a preferred broadcast. Thus, each unique broadcast of the particular talk-radio program may be stored in the database 122 in the system 100 when recognized by the processor 102. In this example, any broadcast of the talk-radio program by the database system may be considered a preferred broadcast and have the associated broadcast information entered into the database.

The operation may also include a step 612 of selecting particular broadcast information to designate preferred broadcasts. Preferred broadcasts may be indicated by selecting broadcast information that subsequent broadcasts must include in order to be added as a database entry. For example, a user may select a particular musical artist as preferred. Any time a broadcast by the particular musical artist is recognized by the database system, the broadcast information associated with the broadcast may be entered as a database entry. Allowing only broadcasts that include preferred broadcast information to be entered into the database may allow less undesired broadcasts and associated broadcast information to be included. If the broadcast information is selected as preferred, the database may be updated to reflect the preferred status in a step 614. The broadcast information input at step 610 may be automatically considered as preferred broadcast information.

The operation may include a step 615 of entering ratings. Various rating fields may exist in the database to be set by a user. As shown in FIG. 3, the database may include rating fields associated with songs, artists, and albums. However, the rating fields may be expanded to include television programming, radio and commercial content, as well as talk-radio shows. The ratings may be used for decisions related to notification as further discussed with regard to FIG. 7. The ratings may also be expanded to include the various broadcast formats. For example, satellite radio may be rated higher than if two equally rated broadcasts were being transmitted according to two different broadcasts. Thus, a user may prefer satellite radio as compared to another broadcast format regardless of the broadcast content. If a user prefers satellite radio and is currently listening to satellite radio, the user may not be notified regardless of broadcast content on another broadcast format because satellite radio is preferred as compared to other available broadcast formats.

The operation may include a step 616 of selecting notification of broadcasts being transmitted containing particular broadcast information. Step 616 allows a user to select notification of a broadcast being transmitted containing broadcast information located in the database by the user or later added, such as that based on user input. For example, a user may desire to be notified when a particular song listed in the database is transmitted according to a selected one or more of the broadcast formats. Each database entry may include at least one field indicating that notification is desired. For example, a song may be entered in the database may have the "Flag_Song_Alert" field, such as that shown in FIG. 3, set to "Y" or yes, indicating that notification is desired when the song is being transmitted according to a selected one or more broadcast format. By selecting notification at step 616, a user may be notified by the system via display, audio cue, or other manner that the song is being transmitted according to any of the available broadcast formats, including a broadcast format that may currently be providing a user with a broadcast through an audio/video system.

Database entries may be configured to include notification priority with respect to one another. For example, column 302 in FIG. 3 includes a field "Song_Rating." The "Song_Rating" field may be configured to receive numerical rating input such as 1 through 10. Other broadcast types may have a similar respective rating. The rating allows comparison of a currently-playing broadcast to one being monitored by the processor. If, for example, the currently-playing broadcast has a higher rating than another broadcast recognized by the processor, notification may not occur because the currently-playing broadcast has priority based on the higher rating. However, if the currently-playing broadcast rating has a lower rating, notification may occur allowing a user to indicate the other broadcast is to be played in lieu of the currently-playing broadcast. Thus, an audio/video system may switch to the broadcast format of the other broadcast. The broadcast formats may also be rated, allowing one particular broadcast format to have priority over another broadcast format. For example, satellite radio may be preferred over HD radio, such that if a user is currently listening to a broadcast according to satellite radio, even if a preferred broadcast is being transmitted via HD radio, the user may not be notified, because satellite radio has a higher priority than HD radio.

The ratings may also carry over into current and newly-entered database entries. For example, in column 302 a rating may be selected for "Artist_Rating" for a previously-transmitted broadcast. Any database entry for the artist may be automatically populated with that rating. If another broadcast by the artist is received resulting in a new database entry, the processor may recognize the same artist, thus populating the field with the previously-selected "Artist_Rating." Other rating fields may be similarly populated for current and newly-created database entries.

If the broadcast information is selected for notification, the database may be updated to reflect desired notification at step 618. If the notification is selected, a step 620 may be performed allowing notification of related broadcast information to be selected. For example, a user may select a particular song by a musical artist for notification. At step 620, the user may select related broadcast information such as any song by the musical artist or any musical artist performing the song. The system may be configured to provide the user layered degrees of relation from which to select. Thus, the user may be able to select various related information for notification.

If the user desires notification of related broadcast information, the database may be updated to reflect the desired notification at step 622. If the user does not desire notification at either step 616 or step 620, the operation may return to step 602 allowing the user to search the database for broadcast information. In alternative examples, the steps of the operation of FIG. 6 may be rearranged, reduced, or increased depending on a desired complexity of the operation.

Figure 7:
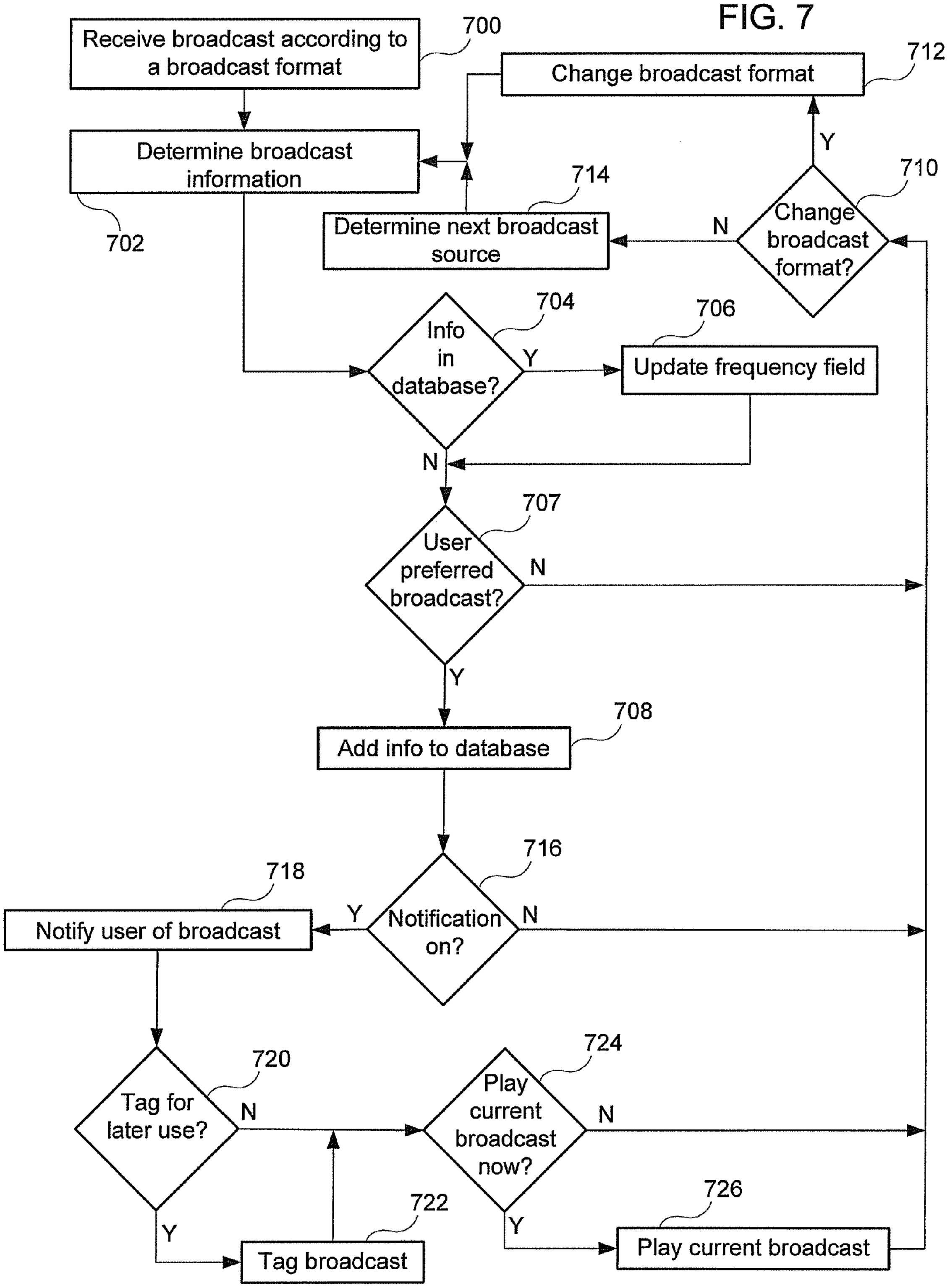
FIG. 7 is a flow diagram of an example operation to operate a broadcast information database system.

FIG. 7 is a flow diagram of an example operation of a broadcast information database system. The operation may include a step 700 of receiving a broadcast according to a broadcast format. The operation may include as step 702 of determining broadcast information of the broadcast. The operation may include a step 704 of determining if the broadcast information for the broadcast is stored in a database. If the broadcast information has previously been stored, the operation may include as step 706 of updating a frequency field associated with the broadcast, such as that described with regard to FIG. 4.

If a database entry associated with the broadcast has not been entered into the database, the operation may perform a step 707 of determining if the broadcast is user-preferred. As discussed with regard to FIG. 6, a user may select particular broadcasts to be preferred based on the broadcast information allowing only particular broadcasts to have associated broadcast information entered in the database. If the broadcast is preferred, the associated broadcast information may be added to the database at step 708. In an alternative example, the user may not desire any broadcasts to be designated as preferred or have the preferred option disabled. In either case, all newly received broadcasts may be entered as database entries at step 708.

In the example operation of FIG. 7, if the broadcast is not preferred, the operation may perform a step 710 of determining if the current broadcast format being monitored should be changed to a different broadcast format. The determination of step 710 may depend on a predetermined condition, such as if the entire operating domain of a broadcast format has been scanned. For example, if the currently monitored format is satellite radio, the determination at 710 may consider if all channels have been monitored. If all the satellite radio channels have been scanned for current broadcast format, the broadcast format may be changed at a step 712. If the broadcast format is not changed, the next broadcast source (such as a channel, frequency, or website, for example) for scanning associated with a particular broadcast format may be determined at step 714.

If the broadcast format is changed at the step 712 or if the next broadcast source is determined for a current broadcast format at 714, the broadcast information may be determined at step 702. If the broadcast format is changed, the system may be configured to begin monitoring broadcast formats at a particular broadcast source or may begin at a randomly selected broadcast source.

If broadcast information associated with a broadcast is added to the database at 708, a step 716 may be performed to determine if notification is desired. As discussed with regard to FIG. 6, a user may desire to be notified if a particular broadcast is being transmitted, allowing the user to switch from a broadcast format being currently provided to the same or different broadcast format of the preferred broadcast. If the user is to be notified, notification may be generated at step 718. If the user is not to be notified, the operation may perform step 710 to change broadcast format at step 712 or broadcast source at step 714.

Upon notification of the preferred broadcast at step 718, a determination to tag the broadcast for later use may occur at a step 720. This allows a user to store the broadcast information for later use, such as that described with regard to FIG. 6. If the user desires the broadcast to be tagged, a step 722 may be performed which tags the broadcast for later use, such as storing the broadcast information.

The operation may perform a step 724 of determining if the preferred broadcast is to be played. The user may be prompted to determine if the user wants to switch from a currently-provided broadcast to the preferred broadcast currently being transmitted on a different broadcast format. If a user selects the preferred broadcast, a step 726 may be performed, which may play the current broadcast by way of switching from a currently-playing broadcast or activating to play the preferred current broadcast. If the user does not select the preferred broadcast, the currently-playing broadcast may continue or the system may continue to be deactivated. Step 610 may be performed subsequent to a decision to play to play a currently received broadcast is made.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:

a memory being a computer-readable storage media configured to store a database having at least one field, the at least one field includes a user broadcast format preference;

a processor in communication with the memory, the processor configured to:

receive a plurality of broadcasts each transmitted according to at least one of a plurality of broadcast formats;

determine broadcast information associated with a first broadcast transmitted according to a first format of the plurality of broadcast formats;

determine a rating of the first broadcast based at least on the user broadcast format preference;

play the first broadcast;

monitor a second broadcast transmitted according to a second format of the plurality of broadcast formats different from the first format of the plurality of broadcast formats;

determine broadcast information associated with the second broadcast;

determine a rating of the second broadcast based at least on the user broadcast format preference; and generate notification of the second broadcast when the rating of the second broadcast is higher than the rating of the first broadcast.

2. The system of claim 1, where the at least one field further includes a user content preference, and the rating of the first broadcast and the rating of the second broadcast are further based on the user content preference.

3. The system of claim 1, where the first broadcast comprises audio content and the second broadcast comprises the same audio content.

4. The system of claim 3, where the audio content is transmitted concurrently on the first broadcast and the second broadcast.

5. The system of claim 3, where the notification is generated in response to the audio content being identical, and the second format being preferred over the first format based on the user broadcast format preference.

6. The system of claim 1, where the notification of the second broadcast is generated only when the second format is preferred to the first format based on the user broadcast format preference.

7. The system of claim 1, where the processor is further configured to compare the broadcast format of the first broadcast and the broadcast format of the second broadcast.

8. The system of claim 1, where the processor is further configured to transmit the notification to a user interface for receipt by the user.

9. The system of claim 1, where the processor is further configured to transmit the notification to a display for receipt by the user.

10. The system of claim 1, where the processor is further configured to transmit the notification as an audio cue for receipt by the user.

11. The system of claim 1, where the processor is further configured to store the rating of the first broadcast in the database.

12. The system of claim 1, where the processor is further configured to store a first entry in the database, where the first entry is indicative of the broadcast information associated with the first broadcast.

13. The system of claim 12, where the processor is further configured to store a second entry in the database, where the second entry is indicative of the broadcast information associated with the second broadcast.

14. The system of claim 13, where the processor is further configured to store the second entry in the database only after confirmation that the broadcast information associated with the second broadcast is a preferred broadcast based on the rating of the second broadcast.

15. The system of claim 1, where the processor is further configured to store the rating of the second broadcast in the database.

16. The system of claim 1, where the processor is further configured to drive a display to provide the broadcast information associated with the first broadcast and to drive the display to provide the notification of the second broadcast.

17. The system of claim 1, where the processor is further configured to determine the broadcast format of the first broadcast and to determine the broadcast format of the second broadcast.

18. The system of claim 1, where the processor is further configured to concurrently monitor the second broadcast while the first broadcast plays.

19. A database system comprising:

a memory being a computer-readable storage media configured to store a database having a user broadcast format preference;

a processor in communication with the memory, the processor configured to:

receive a plurality of broadcasts each transmitted according to at least one of a plurality of broadcast formats;

determine broadcast information associated with a first broadcast transmitted according to a first format of the plurality of broadcast formats;

store a first entry in the database, where the first entry is indicative of the broadcast information associated with the first broadcast;

play the first broadcast having content;

monitor a second broadcast transmitted according to a second format of the plurality of broadcast formats different from the first format of the plurality of broadcast formats;

determine broadcast information associated with the second broadcast; and generate notification of the second broadcast when the content is received in the second broadcast and the second broadcast format is preferred to the first broadcast format based on the user broadcast format preference.

20. The database system of claim 19, where the content is received in the second broadcast while the first broadcast plays.

21. The database system of claim 19, where the processor is further configured to continuously monitor the second broadcast while the first broadcast plays.

22. A method of operating a broadcast information database, the method comprising:

concurrently receiving a plurality of broadcasts each transmitted according to at least one of a plurality of broadcast formats;

determining broadcast information associated with a first broadcast transmitted according to a first format of the plurality of broadcast formats;

determining a rating of the first broadcast based at least on a user broadcast format preference;

storing a first entry in the database, where the first entry is indicative of the broadcast information associated with the first broadcast;

playing the first broadcast;

monitoring a second broadcast transmitted according to a second format of the plurality of broadcast formats different from the first format of the plurality of broadcast formats;

determining broadcast information associated with the second broadcast;

determining a rating of the second broadcast based at least on the user broadcast format preference; and generating notification of the second broadcast when the rating of the second broadcast is higher than the rating of the first broadcast.

23. The method of claim 22, where the determining the rating of the first broadcast is further based on a user content preference, and the determining the rating of the second broadcast is further based on the user content preference.

24. The method of claim 22, where the first broadcast transmits content and the second broadcast transmits the content concurrently with the first broadcast.

25. A non-transitory computer-readable medium encoded with computer executable instructions, the computer executable instructions executable with a processor, the computer-readable medium comprising:

a database having at least one field, the at least one field configured to receive a user broadcast format preference, the computer-readable medium further comprising:

instructions executable to receive a plurality of broadcasts each transmitted according to at least one of a plurality of broadcast formats;

instructions executable to determine broadcast information associated with a first broadcast transmitted according to a first format of the plurality of broadcast formats;

instructions executable to determine a rating of the first broadcast based at least on the user broadcast format preference;

instructions executable to play the first broadcast;

instructions executable to monitor a second broadcast transmitted according to a second format of the plurality of broadcast formats different from the first format of the plurality of broadcast formats;

instructions executable to determine broadcast information associated with the second broadcast;

instructions executable to determine a rating of the second broadcast based at least on the user broadcast format preference; and instructions executable to generate notification of the second broadcast when the rating of the second broadcast is higher than the rating of the first broadcast.

26. The computer-readable medium of claim 25, further comprising instructions executable to store a first entry in the database, where the first entry is indicative of the broadcast information associated with the first broadcast.

27. The computer-readable medium of claim 25, where the at least one field is further configured to receive a user content preference, and the rating of the first broadcast and the rating of the second broadcast are further based on the user content preference.

28. The computer-readable medium of claim 25, further comprising instructions executable to provide access to the database to a user through a user interface module.

* * * * *